United States Patent
Tronc (10) Patent No.: US 9,077,428 B2
(45) Date of Patent: Jul. 7, 2015

(54) HYBRID SPACE SYSTEM BASED ON A CONSTELLATION OF LOW-ORBIT SATELLITES WORKING AS SPACE REPEATERS FOR IMPROVING THE TRANSMISSION AND RECEPTION OF GEOSTATIONARY SIGNALS

(75) Inventor: Jérôme Tronc, Saint Jean (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 106 days.

(21) Appl. No.: 13/516,495

(22) PCT Filed: Dec. 16, 2010

(86) PCT No.: PCT/EP2010/069873
§ 371 (c)(1),
(2), (4) Date: Aug. 10, 2012

(87) PCT Pub. No.: WO2011/073309
PCT Pub. Date: Jun. 23, 2011

(65) Prior Publication Data
US 2012/0300815 A1 Nov. 29, 2012

(30) Foreign Application Priority Data

Dec. 17, 2009 (FR) ...................... 09 59116

(51) Int. Cl.
*H04L 27/00* (2006.01)
*H04B 7/185* (2006.01)

(52) U.S. Cl.
CPC ................. *H04B 7/18521* (2013.01)

(58) Field of Classification Search
None
See application file for complete search history.

(56) References Cited

U.S. PATENT DOCUMENTS 5,758,261 A * 5/1998 Wiedeman ................... 455/13.1
6,023,605 A 2/2000 Sasaki et al.
(Continued)

FOREIGN PATENT DOCUMENTS

EP 0760561 A2 3/1997
EP 0 845 876 A2 6/1998
(Continued)

OTHER PUBLICATIONS

International Search Report, dated Feb. 15, 2011, from corresponding PCT application.
(Continued)

*Primary Examiner* — Chieh M Fan
*Assistant Examiner* — Wednel Cadeau
(74) *Attorney, Agent, or Firm* — Im IP Law PLLC; C. Andrew Im (57) ABSTRACT

The remote communications system, intended for low-throughput data transfer between at least two users located substantially on the surface of a celestial body, includes:
 a plurality of transmitting/receiving surface terminals, each associated to a user,
 one or more geostationary element installed on board satellites placed in geostationary orbit around the celestial body, these geostationary elements being able to transmit data from and to a predefined coverage area on the surface of the celestial body with a line of sight to the geostationary satellite,
 and one or more signal repetition element for the signals transmitted and/or received from the geostationary elements to the surface terminals these traveling repetition elements being on board satellites moving in a traveling orbit; the same frequency band is used for communications between the surface terminals and the traveling elements and for communications between the traveling elements and the geostationary elements.

15 Claims, 2 Drawing Sheets

(56) References Cited

U.S. PATENT DOCUMENTS

| | | |
|---|---|---|
| 6,208,625 B1 | 3/2001 | Zancho et al. |
| 6,339,707 B1 | 1/2002 | Wainfan et al. |
| 6,341,213 B1 * | 1/2002 | Wu .................... 455/12.1 |
| 2004/0157554 A1 * | 8/2004 | Wesel .................... 455/12.1 |

FOREIGN PATENT DOCUMENTS

| | | |
|---|---|---|
| EP | 0 883 252 A2 | 12/1998 |
| FR | 2 764 755 A1 | 12/1998 |
| WO | 95/35602 A2 | 12/1995 |

OTHER PUBLICATIONS

Centre National D'Etudes Spatiales, "Spacecraft techniques and technology, vol. 2: Payloads," Space Technology course, 2005, Section V.2.4, pp. 134-138.

* cited by examiner

| Average elevation | 5° | 5° | 5° | 5° | 5° |
|---|---|---|---|---|---|
| LEO satellite's altitude | 1100 Km | 800 Km | 600 Km | 500 Km | 400 Km |
| Earth's radius | 6378 Km | 6378 Km | 6378 Km | 6378 Km | 6378 Km |
| Satellite's half-angle of view | 58,17 ° | 62,27 ° | 65,58 ° | 67,48 ° | 69,62 ° |
| Cover. radius at average elevation | 1772 Km | 1522 Km | 1321 Km | 1206 Km | 1077 Km |
| Maximum delay Between GEO/LEO signals | 7,0 ms | 5,7 ms | 4,8 ms | 4,4 ms | 3,8 ms |

HYBRID SPACE SYSTEM BASED ON A CONSTELLATION OF LOW-ORBIT SATELLITES WORKING AS SPACE REPEATERS FOR IMPROVING THE TRANSMISSION AND RECEPTION OF GEOSTATIONARY SIGNALS

The invention belongs to the field of long-distance data transmission systems. It relates more specifically to systems and methods of data communication (data transfer, remote control, monitoring terminals, etc.) between users equipped with small mobile terminals.

BACKGROUND OF THE INVENTION AND PROBLEM STATEMENT

The issue of long-distance data transmission from or to a mobile terminal is of particular concern with regard to connections between computers (machine to machine). This field of transmission is therefore characterized by a need for significantly lower data throughput rates than for image or Internet types of connections.

A first approach to this problem is known, followed by existing data transmission systems such as Orbcomm and Argos, which use constellations of low-orbit satellites (LEO, for Low Earth Orbit). In this approach, the normal mode of operation for each LEO low-orbit satellite requires it to be simultaneously visible firstly by a ground control and connection station and secondly by a user terminal.

The satellite thus serves as a communications link between the two parts, and the latency between acknowledgments of receipt and messages is a function of the distance between the satellite and the ground station (GES, for Gateway Earth Station).

However, the coverage provided by the ground station network of systems using low-orbit satellites, such as Orbcomm and Argos, is limited by the deployment of ground stations (GES) and the existing systems only provide a limited coverage of the Earth in this mode. In effect, each ground station allows coverage over a radius of about 3000 km, and each of these systems comprises some twenty ground stations.

It can therefore easily be seen that the coverage areas have large "blind" areas where the system cannot be used. In particular, these areas cover a large portion of the oceanic areas, even a significant portion of continental areas such as Africa and Australia.

In cases where the LEO satellite has no simultaneous visibility of both the user terminal and the GES ground control station, a type of communications method that stores then sends (known to the person skilled in the art as Store & Forward) must be used. In this method the message is stored on board the satellite, which continues moving in its orbit until it flies over the GES ground station, to which it delivers the stored message.

With this communications method communication delays are long and make two-way communications in acceptable conditions difficult, given that the delays are typically between several minutes and the 100 to 150 minutes duration of a complete orbit of the LEO satellite.

Hybrid telecommunications systems for transmitting data between users are also known. These hybrid systems comprise geostationary satellites and a low-orbit satellite constellation.

In particular a first patent document, FR 2764755/U.S. Pat. No. 6,208,625: Method and apparatus for increasing call-handling capacity using a multi-tier satellite network, can be cited.

This document describes a network formed of LEO and geostationary (GEO) satellites able to communicate to each other. On the ground, user terminals are capable of reception/transmission (Rx/Tx) with LEO and GEO satellites. The LEO component filters the traffic received from the terminals and, depending on the urgent nature of the traffic received, directs this traffic either internally to the LEO or to the GEO.

A second patent document, EP 0883252/U.S. Pat. No. 6,339,707: Method and system for providing wideband communications to mobile users in a satellite-based network, proposes a satellite communications system that permits global coverage, reduced transmission delays (Tx), and maximized use of the system's capacity (wideband communication satellite via the interconnection of several medium-orbit—MEO—and geostationary—GEO—constellations).

The MEO and GEO satellites communicate directly to each other by inter-satellite links, which enables traffic routing (for voice and data) on board the satellites according to certain rules.

In addition, this document proposes having the very high frequency spectrum shared and re-used between the GEO and MEO satellites (e.g. between 40 and 60 GHz), in order to enable the function known under the name "seamless handover" for portable terminals (passing from a mobile network to a fixed network with no interruption to the communication in progress).

It is clear that the current hybrid systems are highly complex, synonymous with high implementation and use costs.

OBJECTIVES OF THE INVENTION

The objective of this invention is to propose a new system of data communications between mobile users.

A second objective of the invention is to improve the performance and reduce the cost of a system of data communications between mobile devices.

DESCRIPTION OF THE INVENTION

To this end, the invention envisages in the first place a telecommunications system, intended for low-throughput data transfer between at least two users located substantially on the surface of a celestial body;
the system comprises:
a plurality of transmitting/receiving surface terminals, each associated to a user,
one or more stationary means above the surface of the celestial body, said stationary means being able to transmit data from and to a predefined coverage area with a line of sight to the stationary means,
and one or more signal repetition means for signals transmitted and/or received from both the stationary means and the surface terminals, said repetition means traveling above the surface of the celestial body; a same frequency band being used for communications between the surface terminals and the repetition means and for communications between the repetition means and the stationary means.

Throughout this application, "users located substantially on the surface" means, in particular, terrestrial, maritime or aeronautical users. Similarly, the surface terminals are accepted to be, for example, placed in terrestrial, maritime or aeronautical means.

According to a preferred embodiment, the system comprises at least one ground connection station (GES) for the GEO stationary means. Communications between the ground and the space repetition means are performed via the GEO stationary means and GES connection stations of these GEO stationary means. These communications comprise both the data exchanges between users and potentially the remote and telemetry communications of the space repetition means. Thus this embodiment does not require the ground connection station assigned to the space repetition means to be used.

It is clear that, apart from the case where both users have surface transmitting/receiving terminals, a user of the system can also be connected to a terrestrial network (IP, PSTN, etc.) via a GES ground connection station.

According to a preferred implementation, at least one stationary means is installed on board a satellite in geostationary orbit around the celestial body.

Similarly, preferably, at least one repetition means is on board a low-orbit satellite traveling around the celestial body.

In other words, the invention envisages in particular a system for remote data communications between mobile devices, the system using payloads on board one or more geostationary satellites and on a low-orbit traveling satellite constellation, in which the satellites traveling in orbit act as space repeaters for the signals transmitted and/or received from the geostationary satellites.

Using low-orbit satellites acting as repeaters/amplifiers of signals in the same frequency band as geostationary satellites makes it possible to improve the transmission or reception of signals from geostationary satellites, so as to obtain the best compromise in terms of the cost/coverage ratio and services. As a result, the system makes it possible to improve the performances of the services offered by the geostationary satellite, potentially create new services and expand the geostationary satellite's coverage (e.g. to polar regions).

The constellation of low-orbit traveling satellites, acting as space repeaters, can be, in a preferred embodiment, an LEO (Low Earth Orbit) constellation or alternatively an MEO (Medium Earth Orbit) constellation.

An improvement in the system's performance is thus obtained, compared to the systems of the prior state of the art, due to the fact that the repeater satellite is closer to the Earth than the geostationary orbit, and consequently the losses due to the propagation of signals in free space are much lower.

In an advantageous implementation, at least one repetition means is installed on board a satellite moving in a polar or quasi-polar orbit (orbital inclination greater than 70°) around the celestial body.

A polar orbit makes it possible to improve coverage of high-latitude areas, where good conditions of service cannot be provided by a geostationary satellite.

This hybrid solution (geostationary component and complementary space component) combines the advantages of each component by using the same frequency spectrum on the LEO (or MEO) satellites, on the GEO (Geostationary Earth Orbit) satellites and on the relay link between LEO and GEO.

The frequency spectrum used for this hybrid solution can be in any of the bands allocated to satellite telecommunications services (from low bands, e.g. UHF or VHF, up to high frequencies such as the Ka or Q bands).

Preferably, the frequency band used is the L band (between 0.9 and 2.0 GHz), which is especially suitable for satellite mobile communications.

Indeed, a significant characteristic of the invention consists of the same frequency band being shared between a geostationary satellite and a low-orbit satellite constellation, over the user link. In other words, the communications between the users and the LEO satellite constellation and the communications between the GEO satellite and the LEO satellite both use the same frequency band. This produces a significant advantage compared to the solutions of the prior state of the art.

A secondary characteristic of the invention, valid when the terminal is in the GEO satellite's coverage area, consists of using the same frequency band for the direct communications between the users and the GEO satellite.

In this case, the frequency band is also used for communications between user terminals and at least one stationary means.

According to a first embodiment,
at least one repetition means comprises means of performing an amplification without frequency translation of the signal received from the stationary means,
the air interface used is a CDMA ("Code Division Multiple Access") type of interface,
and at least one user terminal comprises means of managing the arrival of two signals bearing Doppler and delay differences.

In this case, preferably, the user terminal's means of managing the arrival of two signals comprising Doppler and delay differences are a "Rake" type of receiver well known to the person skilled in the art.

According to an alternative embodiment:
the air interface is a TDMA type,
the system uses two separate signals: one for the stationary means and one for the repetition means,
time-division multiplexing is used for distributing the capacity between the stationary means and the repetition means, with guard intervals and Doppler pre-compensation at the repetition means.

Advantageously, at least one user terminal comprises means of using the space diversity or MIMO (Multiple Input Multiple Output) techniques to recombine the signals coming from both a stationary means and a repetition means.

According to another embodiment,
at least one LEO repetition means relays the signal, in a transparent or regenerative way, without frequency translation of the received signal
and the air interface comprises means of limiting interference at a user terminal between the signals from a GEO stationary means and the signals relayed by an LEO repetition means.

According to a second embodiment,
at least one LEO repetition means relays the signal, in a transparent or regenerative way, in an adjacent channel, before its retransmission,
and the communications system comprises a coordination entity for coordinating the frequency plans between the GEO stationary means and the LEO repetition means.

In a second aspect the invention envisages a telecommunications method, intended for low-throughput data transfer between two users located substantially on the surface of a celestial body; the first user being equipped with a user terminal, with a line of sight to at least one repetition means, and the repetition means having a line of sight to at least one stationary means, the method using a telecommunications system as described, the method comprises in particular steps in which:
the first user's terminal transmits a first uplink signal, representative of data to be transmitted, to the repetition means,
the repetition means receives and amplifies the first signal transmitted by the user terminal on the ground and transmits it in the form of a second uplink signal to the stationary means in the same frequency band, the stationary means ensures the good final transmission of data to the second user.

The invention also envisages a telecommunications method, intended for low-throughput data transfer between two users located substantially on the surface of a celestial body; the second user being equipped with a second user terminal, with a line of sight to at least one repetition means, and the repetition means having a line of sight to at least one stationary means, the method using a telecommunications system as described, the method comprises in particular steps in which:

the stationary means retransmits a signal, representative of data to be transmitted, received from a first user, to the repetition means in the form of a first downlink signal, the repetition means receives and amplifies the first downlink signal transmitted by the stationary means and transmits it to the second user's terminal on the ground in the same frequency band in the form of a second downlink signal.

It is understood that the two parts of the method can be used at the same time.

Preferably, the re-use of frequencies between the different components of the communications system is performed in a coordinated way to minimize intra-system interference.

In effect the two constellations, the one in low orbit and the other in geostationary orbit, here use as far as possible the same available spectrum, preferably in the L band (between 0.9 and 2.0 GHz) but all the bands statutorily allocated to satellite telecommunications services, from low bands, e.g. UHF or VHF, up to high frequencies such as the Ka or Q bands, can be envisaged.

In other aspects the invention envisages a repetition means and a user terminal for a communications system as described.

As the preferential or particular characteristics and the advantages of this repetition means and of this user terminal are similar to those of the system as described in brief above, these advantages are not repeated here.

BRIEF DESCRIPTION OF THE FIGURES

The goals and advantages of the invention will be better understood in reading the description and drawings of a particular embodiment, given as a non-limiting example, for which the drawings show.

DETAILED DESCRIPTION OF AN EMBODIMENT OF THE INVENTION

Figure 1:
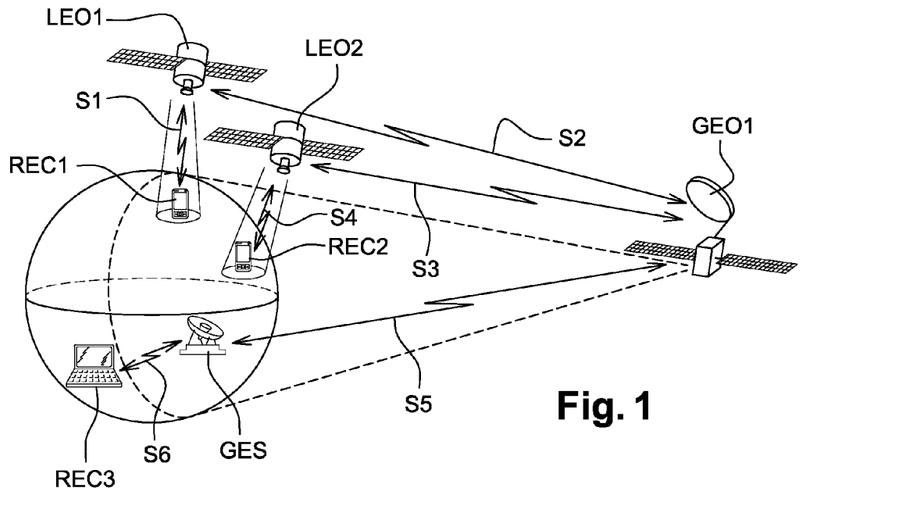
FIG. 1: the general architecture of the system.
Figure 2:
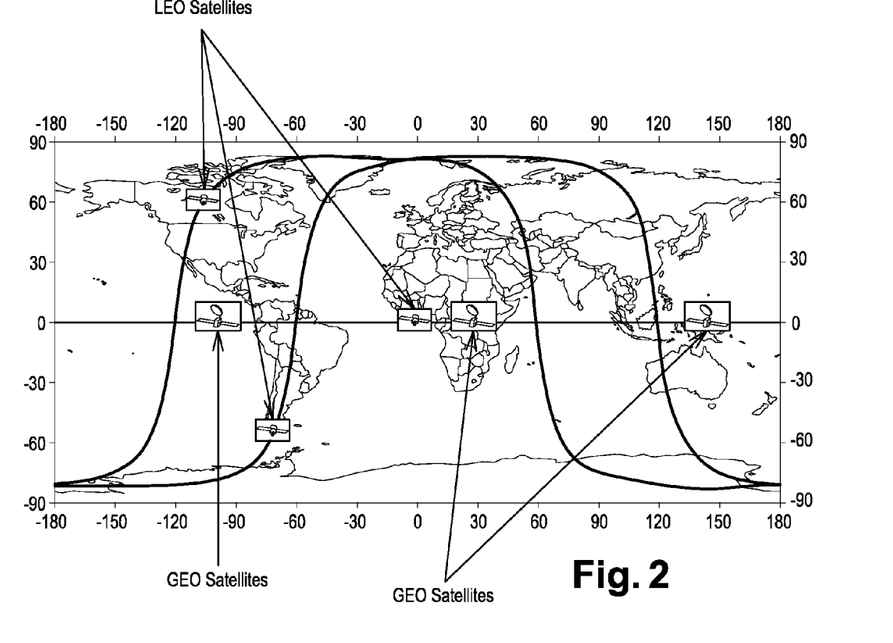
FIG. 2: an illustration of the positions of the LEO and GEO satellites on a planisphere, at a given time.

The system architecture is shown in FIGS. 1 and 2. As can be seen in these figures, the proposed system uses two satellite constellations. The first constellation comprises one or more geostationary satellites (also called GEO in the rest of the description).

In this case the system, described here in a non-limiting example, is based on a constellation of three geostationary satellites, GEO1, GEO2, GEO3, placed in geostationary orbit over three main continental areas (e.g. at longitudes 265° E, 25° E, 145° E respectively, as shown in FIG. 2). The geostationary satellites GEO1, GEO2, GEO3 operate in the band known as MSS L (1.5/1.6 GHz).

The constellation of geostationary satellites GEO1, GEO2, GEO3 is controlled by one or more terrestrial controls, which are placed in line of sight of the geostationary satellites GEO1, GEO2, GEO3 they control, and which perform the control and remote control functions. The constellation of geostationary satellites GEO1, GEO2, GEO3 is connected to terrestrial communications networks by one or more GES terrestrial connection stations, placed in line of sight of the geostationary satellites GEO1, GEO2, GEO3 via an FL (Feeder Link) link, in a way known per se.

The system is completed by a second constellation of three satellites traveling in low or medium orbit (satellites known as LEO or MEO), with orbit altitudes typically between 400 and 20000 km, which act as space repeaters. It is clear that the system can use a larger or smaller number of satellites in each of the LEO and geostationary constellations, the difference being a more or less complete coverage of the Earth.

In the example described here, the traveling satellites are assumed to be of a type moving in low orbit (known as LEO), and placed in heliosynchronous orbit at an altitude of 567 km with an inclination of 97.7° in three different orbital planes (with right ascension nodes at 0°, 60° and 120°). It is noted that the heliosynchronous orbit is defined by the fact that each satellite, after several orbits, passes the line of sight of the same point on the Earth at the same local solar time. This system uses three low-orbit satellites, LEO1, LEO2, LEO3; their orbital courses are shown in FIG. 2 as a non-limiting example. In this example these three low-orbit satellites, LEO1, LEO2, LEO3, could be "piggyback" payloads installed on board satellites whose main payload is dedicated to another mission, e.g. observing the Earth.

It is clear that the constellation of traveling satellites, LEO1, LEO2, LEO3, can comprise satellites moving in orbits with different altitudes or inclinations.

These low-orbit satellites, LEO1, LEO2, LEO3, operate in the same frequency band as the geostationary satellites, GEO1, GEO2, GEO3, and in this case in the MSS L band (1.5/1.6 GHz).

The communications system is aimed at any user, in particular a user who is mobile on the surface of the Earth, and equipped with a transmitting/receiving terminal REC1, transmitting or receiving data to or from another user, who possibly has a transmitting/receiving terminal REC2, and is also possibly mobile on the surface of the Earth. User REC3 can also be connected to a terrestrial network (IP, PSTN, etc.) and be connected to user REC1 via the GES.

Each user terminal REC1 and REC2 is a transportable terminal, comprising in particular a user interface, e.g. a type such as a keyboard, touch screen or data link to an item of electronic equipment, a battery and/or power supply means, a processor and/or electronic control unit, means of storing programs or data, and means of transmitting and receiving signals, operating in the MSS L frequency band, in this example described here in a non-limiting way.

In this example each user terminal REC1 and REC2 has an omni-directional antenna, designed to receive signals coming either from any one of the low-orbit satellites, LEO1, LEO2, LEO3, or from any one of the geostationary satellites, GEO1, GEO2, GEO3.

In the implementation described here, each user terminal REC1 and REC2 comprises a "Rake" type of receiver, well known to the person skilled in the art, for the forward channel. It is noted that a Rake receiver is a radio receiver, originally designed to compensate for attenuation due to the multiple paths of radio waves for the terrestrial systems. It is based on the concept that the reflected signals can be distinguished (typically in the case where a CDMA multiplexing technique is used) and therefore can be combined in a suitable way, thus taking advantage of multiple propagations. For the return channel, the GEO satellites are assumed to be transparent and the Rake receiver is located at the GES (the GEO satellites' connection stations).

However, it should be noted that in the case where the GEO satellites are of a regenerative type, it would be necessary to install a Rake receiver on board them (replacing the receiver at the GES).

Operating Mode

A communication between two user terminals REC1, REC2, assumed to be in line of sight to two low-orbit satellites, LEO1, LEO2 respectively, and the same geostationary satellite GEO1, comprises several steps, as shown in FIG. 1:

the first user terminal REC1 transmits a first signal S1 to the first low-orbit satellite LEO1, the low-orbit satellite LEO1 receives and amplifies signal S1 transmitted by user terminal REC1 on the ground and transmits it in the form of signal S2 to the geostationary satellite GEO1, the geostationary-orbit satellite GEO1 receives signal S2 and, if conditions allow it, signal S1 and re-transmits them in the form of signal S3 to the second low-orbit satellite LEO2, either directly (with routing on board the satellite) or via the GES connection station. Signals S1 and S2 are processed with a Rake receiver, either on board (in the scenario with on-board routing) or at the GES station (this solution is preferred for reasons of a simpler implementation).

the low-orbit satellite LEO2 receives and amplifies signal S3 transmitted by geostationary-orbit satellite GEO1 and transmits it in the form of signal S4 to user terminal REC2 on the ground, user terminal REC2 receives signal S4 and possibly signal S3, if conditions allow it. A Rake receiver allows these two signals to be recombined at the user terminal.

In a case involving user terminals in line of sight to two different geostationary satellites GEO1, GEO2, the link between the two user terminals comprises in addition a segment of communication between these satellites, for example, but not exclusively, through GES connection stations and ground links or through a direct GEO inter-satellite link, if it exists.

It is naturally understood that carrying out a communication between a user REC1 having a portable transmitting/receiving terminal, and another user REC3 connected through a "standard" terrestrial telecoms network (PSTN, IP, etc.) via the GES connection station can also be envisaged.

In this case:

the first user terminal REC1 transmits a first signal S1 to the first low-orbit satellite LEO1, the low-orbit satellite LEO1 receives and amplifies signal S1 transmitted by user terminal REC1 on the ground and transmits it in the form of signal S2 to the geostationary satellite GEO1, the geostationary-orbit satellite GEO1 receives signal S2, and possibly signal S1, and re-transmits it in the form of signal S5 to the GES connection station.

the GES connection station receives signal S5 (combining, when necessary, signals S1 and S2 contained in S5 by means of a Rake receiver) and transmits it in the form of signal S6 to user terminal REC3 on the ground via a standard terrestrial network.

It is noted that, in FIG. 1, the direct links between user terminals REC1, REC2 and REC3 and geostationary satellite GEO1 are not shown in order to simplify the figure.

Different approaches can be envisaged for the space repeater installed on-board a low-orbit satellite LEO1, LEO2, LEO3:

Either, preferably, a simple amplification without frequency translation of the signal received from the GEO geostationary satellite. However, this implies the use of an air interface able to support the arrival of two signals comprising some Doppler and delay differences. This is, for example, the case of a CDMA—Code Division Multiple Access—type of air interface associated to a Rake receiver.

Or, alternatively, the use of two separate signals (one for the GEO satellite and one for the LEO satellite). For example, it is possible to use a TDMA (Time Division Multiple Access) type of air interface, known per se, envisaging either time-division multiplexing to divide the capacity between the LEO and GEO satellites (with guard intervals and Doppler pre-compensation at the LEO traveling satellite), or the use of two sub-channels (one for the GEO satellite and one for the LEO satellite).

In the implementation described here as an example, the first approach has been selected because it offers a simple and effective solution.

In effect it takes advantage of the satellites' diversity since the signals from both LEO and GEO satellites can be combined in a Rake receiver to obtain a better signal-to-noise ratio. This technique of improving the signal-to-noise ratio makes it possible to obtain a lower bit error rate, a lower EIRP (Effective Isotropically Radiated Power) transmitted power, or a greater margin in the link budget.

In addition, for a user terminal REC1, with a line of sight at the same time to a low-orbit satellite LEO1 and to a geostationary satellite GEO1, if the propagation conditions result in the loss of a link to one of the satellites to which it is connected (due to the change in the geometry of the link with the LEO varying as a function of time, or because of obstacles in the line of sight of one of the two satellites LEO1 and GEO1), the other link can allow communication to be maintained.

This concept, of simple amplification without frequency translation of the signal received from the GEO satellite, can be implemented thanks to the possibility offered by the Rake receiver, included in user terminal REC1, REC2, of combining different signals from different paths coming from an LEO low-orbit satellite and a GEO geostationary-orbit satellite.

In the scenario of satellite data communications, which is the subject of this implementation, the multi-path component is generally negligible. In this case, the Rake receiver is simply used to combine several direct signals coming from several LEO and GEO satellites, since the different signals can be considered fictitious "multiple path" components.

The signals received can then be combined in the user terminal REC1, REC2 according to three main algorithms, known to the person skilled in the art and not therefore described any further here: by selecting the best signal (known as "selection combining"), by simple equal combination of the signals (known as "equal gain combining"), or weighted recombination of the signals to maximize the total signal-to-noise ratio (known as "maximal ratio combining"). The last algorithm (Maximum Ratio Combining) is the preferred algorithm because it is the most efficient in terms of the signal-to-noise ratio obtained.

One of the key issues related to combining signals is that each path followed potentially has a very different length because of the relative position of the elements: user-LEO satellite-GEO satellite. In order to balance the difference in propagation time, which also varies over time, suitable data buffers must be provided for at the Rake receiver. The sizing of these buffers depends on the worst-case delay difference between the different paths, and on the maximum data transfer throughput used.

Figure 3:
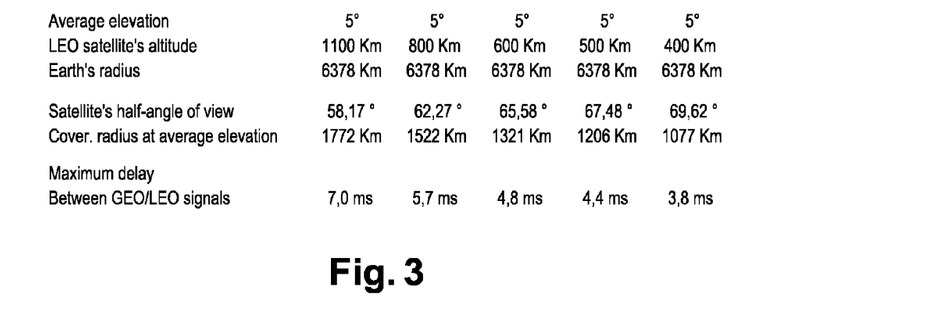
FIG. 3: a table of the orders of magnitude for the delays between a GEO satellite's signals and an LEO satellite's signals for different LEO orbit altitudes.

In the system proposed, the time difference remains less than 5 ms for the constellation of traveling satellites LEO1, LEO2, LEO3 envisaged. The table in FIG. 3 gives several orders of magnitude of delays for different LEO orbit altitudes relative to a GEO satellite.

It must also be noted that the communications services envisaged for the system according to the invention are low-throughput data transmissions. Because of this, the necessary size of the data buffer remains reasonable.

With this approach using a Rake receiver, in the case of a CDMA multiplexing technique, the LEO and GEO satellites share the same frequency band (MSS L band in this example) without generating harmful interference.

Figure 4:
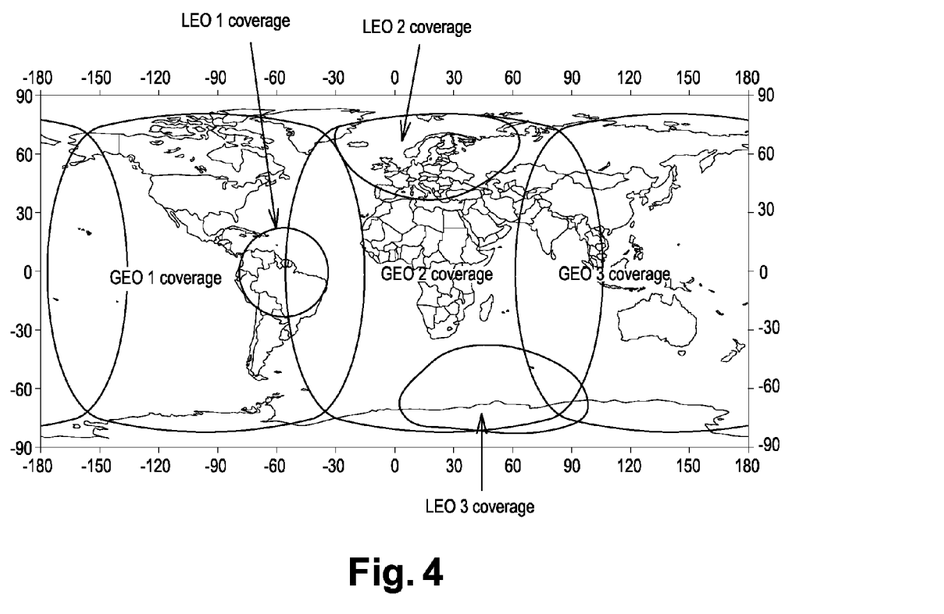
FIG. 4: the coverage areas of the LEO and GEO satellites of the constellation described.

Frequency planning and issues of coverage must also be taken into consideration, because the LEO and GEO coverage areas must be coordinated in order to ensure the correct operation of the system. In the proposed approach the coverage of the GEO satellites consists of a global beam covering the whole of the visible surface of the Earth. This approach makes it possible to avoid or limit the transfer procedures for the LEO satellites (known to the person skilled in the art under the term "hand over") between different beams coming from one (or more) GEO satellites. The LEO coverage is therefore included within the GEO's coverage, as shown in FIG. 4. The LEO satellites thus simply relay the signals of the GEO satellites under which they are located.

In the above example:
  Satellite LEO1 relays the signals from and to satellite GEO1.
  Satellites LEO2 and LEO3 relay the signals from and to satellite GEO2.
  There is no LEO satellite in satellite GEO3's coverage at the point in time shown in FIG. 4. In effect, at that time satellite LEO3 is connected to satellite GEO2.

As any one of the LEO satellites moves in the GEO satellites' coverage area, it can have visibility with different GEO satellites. However, it is assumed that at a given time it is connected to a single geostationary satellite. When several GEO satellites are in the traveling LEO satellites' area of visibility, different strategies can be adopted for selecting the GEO satellite to which the LEO must be connected (e.g. on a criterion of the best signal received at the LEO satellite, or a geometric criterion of minimizing the distance between the LEO and GEO which can be predicted in advance based on the ephemeris of the satellites). In the above example, the LEO satellite is connected to the GEO satellite providing the best received signal.

With these hypotheses it is not necessary to devise complex frequency planning strategies and all the satellites (the three GEO satellites and the three LEO satellites) can, for example, operate on a single CDMA channel.

Unlike the approach of the prior state of the art, of the Orbcomm or Argos type, the system proposed is able to provide two-way data communications, based on the fact that the GEO satellite relays the LEO satellites' communications.

According this approach, once the user terminal REC1, REC2 is in the coverage area of a traveling satellite LEO1, LEO2, LEO3, it is possible to communicate bi-directionally and in real-time with it. The requirement for simultaneous visibility by the traveling satellite LEO1, LEO2, LEO3, the user terminal REC1, REC2 and a ground connection station is eliminated, which consequently means that complete coverage of the Earth can be envisaged.

The delay for communicating with a user terminal REC1 on the ground is thus solely a function of the frequency of passage of the orbiting satellites LEO1, LEO2, LEO3, which depends directly on the orbit chosen for these satellites and the number of these satellites (up to a continuous coverage of the Earth).

BENEFITS OF THE INVENTION

Thanks to the combination of a constellation of traveling LEO satellites (which allows a more efficient service to be provided for the polar regions) and a GEO constellation (which provides a high-quality service to equatorial regions and low latitudes), the average duration of a satellite's non-visibility for a user terminal REC1, REC2 is canceled or significantly reduced compared to the systems of the prior state of the art, especially when high angles of elevation are sought (in the case of satellite mobile communications the signal's blocking factor is reduced at high elevations, which leads to better service availability).

It is understood that a system as described thus provides significantly improved availability for users who have to operate in remote areas little covered by traditional communications systems.

Other advantages of the solution chosen are especially apparent when it is compared to the existing solutions using low-orbit satellites, geostationary satellites or hybrid constellations.

1/ The invention provides many benefits compared to a satellite communications solution employing a constellation of low-orbit satellites (such as Orbcomm or Argos, for example).

Connection stations do not need to be deployed for communications between the LEO low-orbit satellites and the terrestrial network infrastructure. In effect, the connection station of the GEO satellite or satellites ensures a permanent access to the LEO low-orbit satellites.

It is not necessary to deploy Tracking/Telemetry and Command (TT&C) stations in the constellation of low-orbit satellites; the TT&C signals are also relayed by the GEO satellite or satellites. It is understood that the low-orbit satellites are controlled, from the ground, by the control stations of the stationary satellites, via these satellites GEO1, GEO2, GEO3.

The design of the low-orbit satellites is significantly simplified (simplified relay function placed in orbit).

2/ The invention provides the following benefits compared to a satellite communications solution employing a geostationary satellite:

The geostationary satellite's coverage is extended to cover, for example, the polar areas.

The link budget performance is improved; this allows, for example, miniaturization of user terminals, reduction in the power used by the terminals (less power to close the link budget, therefore greater battery autonomy for battery-operated terminals) or improved throughputs and availability.

A reduced latency time for access to the network and reception of the acknowledgment of receipt.

3/ The invention provides the following benefits compared to a hybrid satellite communications system (including the state of the art) comprising one or more geostationary satellites and a constellation of low-orbit satellites:

A common protocol is used between the two systems, more efficient than each protocol taken separately.

The frequency band used is shared, with mechanisms ensuring that infra-system interference is limited.

As a result of its design the concept is especially suited to user terminals with low directivity and does not require pointing to be maintained in the direction of the low-orbit satellites. In effect, it is sufficient for the user terminal to point towards a GEO or LEO satellite to ensure communication.

The applications envisaged relate to the improvement of future mobile geostationary satellite systems (MSS—Mobile Satellite Services), including aeronautical mobile satellite services such as AMSS (Aeronautical Mobile Satellite Service) and AMSRS (Aeronautical Mobile Satellite Route Services), in the UHF, L, S, C or X band based on the deployment of a much less complex low-orbit constellation than the existing MSS constellations (such as Globalstar or Iridium) for voice or data communications or exchanges of machine-to-machine (M2M) messages.

This concept can also be applied to data, television or radio mobile satellite broadcasting systems (e.g. radio broadcasting in S-DAB standard using a BSS allocation in the L band or mobile television broadcasting in DVB-SH standard using an MSS allocation in the S band).

Another use of this concept regards data exchanges for navigation applications (in particular, maritime or aeronautical). In these applications, known to the person skilled in the art as SBAS ("Satellite Based Augmentation System"), there are currently no means of covering mobile devices located near the poles. The invention allows this problem to be remedied with a geostationary-orbit satellite and a low-orbit traveling satellite with a line of sight to the mobile device.

Similarly, any coverage of a shadow area of conventional communications devices is potentially possible, once this area can come into the line of sight of a low-orbit satellite or a traveling means.

Use of a telecommunications system or method according to the invention thus makes it possible to extend the coverage area of communications means comprising shadow areas, and notably to extend the coverage area of an SBAS system using a geostationary satellite.

In the case where the space repeater transmits in an adjacent channel to that of the GEO satellite in a regenerative way, an advantage of the invention concerns the possibility of a potential simplification of the exchange protocols between the user terminals and the LEO satellites. In particular, the LEO satellites can perform a conversion to a specific exchange protocol for the GEO (in order to take into account, for example, propagation delay constraints specific to the GEO), or aggregate messages and optimize use of the bandwidth.

Another great appeal of this concept is the possibility of having a permanent quasi-real-time link between the mission and control network and the LEO satellite constellation through the GEO relay and connection station.

It is further understood that the system does not necessarily require the deployment of a dedicated LEO or GEO satellite constellation. Indeed it is possible to use the available transmission capacities on already-existing GEO satellite constellations. In this case, the frequency band of the GEO constellation used is naturally chosen as the LEO satellites' working frequency band. This allows the problem to be solved of few frequency bands available for mobile satellite services using non-geostationary satellites, and this therefore offers a regulatory advantage for the deployment of an LEO satellite constellation operating on a secondary basis in the same frequency band as the GEO satellite or satellites.

Similarly, the functions envisaged for the LEO satellites can in fact be carried out by payloads installed as passengers on LEO satellites mainly dedicated other functions. In this case, the decisive criterion is the orbit envisaged for the LEO satellite. An advantageous choice is that of Earth observation satellites, which frequently use a highly inclined heliosynchronous orbit and thus cover the high latitudes. This utilization of payloads as passengers is naturally very advantageous in terms of the cost of deploying the system.

The system described here therefore forms a simple and economic solution compared to other possible alternatives, such as:

1/ deploying a large number of ground stations so as to offer a permanent connection between the LEO satellites and the ground, which is an expensive and complex solution to implement, in particular for covering the oceans (the Globalstar constellation is a good illustration of this difficulty);

2/ using inter-satellite links so as to offer a permanent connection between the LEO satellites and a limited number of ground stations. That solution has the inconvenience of adding complexity and an additional cost to the space segment (the Iridium constellation is a good illustration of this solution).

VARIANTS OF THE INVENTION

Using the space diversity (or MIMO techniques) at the user terminal for recombining the signals coming from both the GEO satellite and the LEO satellite can be envisaged in order to further improve the link budget.

The satellite repeater can be a simple "transparent" analog repeater, which is the simplest solution but imposes design constraints on the air interface so as to limit interference at the terminal between signals from the GEO satellite and signals relayed by the LEO satellite.

An alternative solution consists of relaying the signal (in a transparent or regenerative way) in a sub-channel of a single band on board the relay satellite. This solution requires a coordination entity for coordinating the frequency plans between the GEO and LEO satellites.

The relay satellite constellation can also implement additional functions (store & forward, aggregating signals).

The repeater satellite constellation can offer a global or partial coverage of the Earth, depending on objectives.

The repeater satellite constellation can offer coverage that is continuous in time (for real-time services available at all times) or solely an access with a certain delay (for non-real-time services) using constellations with a smaller number of satellites.

It is also clear that the concept described, using the same frequency band for communications between the surface terminals and the repetition means and for communications between the repetition means and the stationary means, can be applied solely on the forward channel or return channel, or in both directions.

The invention claimed is:

1. Telecommunications system, intended for low-throughput data transfer between at least two users located substantially on the surface of a celestial body, comprising:
    at least two transmitting/receiving surface terminals, each associated with a different user,
    one or more stationary means GEO above the surface of the celestial body, these stationary means being able to transmit data from and to a predefined coverage area with a line of sight to the stationary means, and
    one or more signal repeater to repeat signals transmitted and/or received from the stationary means GEO and the surface terminals, said repeater traveling above the surface of the celestial body and comprising means of performing an amplification without frequency translation of the signal received from the stationary means GEO; a same frequency band being used for communications between the surface terminals and the repeater and for communications between the repeater and the stationary means; and wherein at least one user terminal utilizes a CDMA type interface to manage arrival of two signals bearing Doppler and delay differences.

2. Telecommunications system according to claim 1, further comprising at least one ground connection station (GES) for the GEO stationary means; and wherein communications between the repeater and a terrestrial operator are performed via the GEO stationary means and GES connection stations of the GEO stationary means.

3. Telecommunications system according to claim 1, wherein at least one stationary means GEO is installed on board a satellite placed in geostationary orbit around the celestial body.

4. Telecommunications system according to claim 1, wherein at least one repeater is installed on board a satellite moving in low orbit traveling around the celestial body.

5. Telecommunications system according to claim 1, wherein at least one repeater is installed on board a satellite moving in a polar orbit around the celestial body.

6. Telecommunications system according to claim 1, wherein the frequency band is the L band.

7. Telecommunications system according to claim 1, wherein the frequency band is also used for direct communications between the user terminals REC and at least one stationary means GEO.

8. Telecommunications system according to claim 1, wherein said at least one user terminal managing the arrival of two signals comprising Doppler and delay differences comprises a Rake type of receiver.

9. Telecommunications system according to claim 1, wherein at least one repeater is a transparent analog repeater; and wherein an air interface comprises means of limiting interference at a user terminal REC between the signals from a GEO stationary means and the signals relayed by the transparent analog repeater.

10. Telecommunications system according to claim 1, wherein at least one repeater relays the signal, in a transparent or regenerative way, in an adjacent channel, before its retransmission; and wherein the communications system comprises a coordination entity for coordinating the frequency plans between the GEO stationary means and the repeater.

11. Telecommunications system according to claim 2, wherein at least one stationary means GEO is installed on board a satellite placed in geostationary orbit around the celestial body.

12. Telecommunications system according to claim 2, wherein at least one repeater is installed on board a satellite moving in low orbit traveling around the celestial body.

13. Telecommunications system according to claim 3, wherein at least one repeater is installed on board a satellite moving in low orbit traveling around the celestial body.

14. Telecommunications method, intended for low-throughput data transfer between two users located substantially on the surface of a celestial body; the first user being equipped with a user terminal, with a line of sight to at least one repeater, and the repeater having a line of sight to at least one stationary means above the surface of the celestial body, the stationary means configured to transmit data from and to a predefined coverage area, the method comprises the steps of:

transmitting a first uplink signal, representative of data to be transmitted, to the repeater by the first user's terminal;

receiving and amplifying the first uplink signal transmitted by the user terminal on the ground; and transmitting the amplified first uplink signal in the form of a second uplink signal to the stationary means without frequency translation in the same frequency band as the first uplink signal by the repeater, the stationary means ensuring a final transmission of data to a user terminal of the second user and utilizing a CDMA type interface by at least one user terminal to manage arrival of two signals bearing Doppler and delay differences.

15. Telecommunications method, intended for low-throughput data transfer between two users located substantially on the surface of a celestial body; the second user being equipped with a second user terminal, with a line of sight to at least one repeater and the repeater having a line of sight to at least one stationary means, the method comprises the steps of:

retransmitting a signal, representative of data to be transmitted, received from a first user via a GES connection station, to the repeater in the form of a first downlink signal by the stationary means;

receiving and amplifying the first downlink signal transmitted by the stationary means;

transmitting the amplified first downlink signal to the second user's terminal on the ground without frequency translation in the same frequency band as the first downlink signal in the form of a second downlink signal by the repeater; and utilizing CDMA type interface by at least one user terminal to manage arrival of two signals bearing Doppler and delay differences.

* * * * *